US010731374B2

(12) United States Patent
Shaske

(10) Patent No.: US 10,731,374 B2
(45) Date of Patent: Aug. 4, 2020

(54) SOLID MAST RAISER SYSTEM

(71) Applicant: Thomas Arthur Shaske, Pinetta, FL (US)

(72) Inventor: Thomas Arthur Shaske, Pinetta, FL (US)

( * ) Notice: Subject to any disclaimer, the term of this patent is extended or adjusted under 35 U.S.C. 154(b) by 0 days.

(21) Appl. No.: 16/427,157

(22) Filed: May 30, 2019

(65) Prior Publication Data

US 2019/0368218 A1 Dec. 5, 2019

Related U.S. Application Data

(60) Provisional application No. 62/678,132, filed on May 30, 2018.

(51) Int. Cl.

| | |
|---|---|
| ***E04H 12/34*** | (2006.01) |
| ***B66C 23/70*** | (2006.01) |
| *B66D 1/12* | (2006.01) |
| *B66C 1/10* | (2006.01) |
| *E04H 12/22* | (2006.01) |

(52) U.S. Cl.

CPC .......... *E04H 12/34* (2013.01); *B66C 23/701* (2013.01); *B66C 23/707* (2013.01); *E04H 12/347* (2013.01); *B66C 1/108* (2013.01); *B66D 1/12* (2013.01); *E04H 12/22* (2013.01)

(58) Field of Classification Search

CPC ......... E04H 12/18; E04H 12/22; E04H 12/34; E04H 12/347; B66C 23/701; B66C 23/703; B66C 23/707

USPC ............................ 52/111, 121, 632; 212/347

See application file for complete search history.

(56) References Cited

U.S. PATENT DOCUMENTS

| | | | | |
|---|---|---|---|---|
| 918,579 A * | 4/1909 | Murch | D06F 53/04 | 248/353 |
| 2,101,839 A * | 12/1937 | Crawford | B66C 11/20 | 212/204 |
| 2,384,279 A * | 9/1945 | Calhoun | E04H 12/182 | 52/121 |
| 2,675,211 A * | 4/1954 | Regoord | E04H 12/182 | 254/387 |
| 2,822,067 A * | 2/1958 | Price | H01Q 1/1235 | 52/121 |

(Continued)

FOREIGN PATENT DOCUMENTS

| | | | |
|---|---|---|---|
| DE | 3729353 A1 * | 3/1988 | F21S 8/088 |
| EP | 1277884 A2 * | 1/2003 | E01F 13/04 |

(Continued)

*Primary Examiner* — Robert Canfield

(57) ABSTRACT

A solid mast raiser system is disclosed herein. The solid mast raiser system may include a slot configured to house a mast. Further, the slot may be further configured to be inserted in to a predrilled bore in the ground. Further, a length of the slot may be matched to a depth of the predrilled bore in the ground. Further, the solid mast raiser system may include a stanchion configured to be attached to the slot. Further, the stanchion may be concentrically aligned with the slot. Further, the stanchion may rest upon a cable. Further, the solid mast raiser system may include a launcher coupled to the stanchion through a cable. Further, the launcher may be configured to raise and retract the stanchion. Further, the launcher may be configured to be affixed to the ground. Further, the launcher may comprise a first hole concentrically aligned with the slot.

20 Claims, 21 Drawing Sheets

106

104

102

(56) References Cited

U.S. PATENT DOCUMENTS

| | | | | |
|---|---|---|---|---|
| 2,983,474 | A * | 5/1961 | Hanna | H01J 9/006 248/161 |
| 3,606,713 | A * | 9/1971 | Runquist | E04H 12/182 52/115 |
| 4,040,217 | A * | 8/1977 | Cloup | E04H 12/34 52/115 |
| 4,580,377 | A * | 4/1986 | Sundin | E04H 12/182 254/400 |
| 5,469,936 | A * | 11/1995 | Lauga | B65F 1/1457 187/205 |
| 2018/0245296 | A1 * | 8/2018 | Heald | E01F 9/646 |

FOREIGN PATENT DOCUMENTS

| | | | | |
|---|---|---|---|---|
| ES | 2119663 | A1 * | 10/1998 | E01F 13/04 |
| FR | 2687702 | A1 * | 8/1993 | E01F 13/046 |
| GB | 191214260 | A * | 10/1912 | E04H 12/18 |
| WO | WO-9602718 | A1 * | 2/1996 | F21V 21/22 |

* cited by examiner

SOLID MAST RAISER SYSTEM

The current application claims a priority to the U.S. Provisional Patent application Ser. No. 62/678,132 filed on May 30, 2018.

FIELD OF THE INVENTION

The present disclosure relates generally to mast systems. More specifically, the present disclosure describes a solid mast raiser system.

BACKGROUND OF THE INVENTION

In present times, individuals are always looking for ways to compartmentalize support masts. Currently, raised equipment platforms such as wind turbines, power junctions, scientific equipment, and/or similar devices are set at the top of fixed-height towers. These towers are effective for attaining a raised position, but are difficult and costly to install, often requiring cranes or powered armatures to set them in the upright position. Additionally, the elevated positions of the devices atop the towers makes routine maintenance significantly more difficult. Ladders, cherry-picker booms, cranes, elevators, even belaying and rigging systems are all known methods of getting a technician up to the device in question; but all have significant costs associated in time, difficult, complexity, cost, and hazard to the user. Conventional mast raiser systems known in the art incorporate telescopic masts, leading to weaker structural integrity of the mast raiser systems.

Therefore, there is a need for an improved solid mast raiser system that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a solid mast raiser system is disclosed. Further, the solid mast raiser system may include a slot configured to house a mast. Further, the slot may be further configured to be inserted in to a pre-drilled bore in the ground. Further, a length of the slot may be matched to a depth of the predrilled bore in the ground. Further, the solid mast raiser system may include a stanchion configured to be attached to the slot. Further, the stanchion may be concentrically aligned with the slot. Further, the stanchion may rest upon a cable. Further, the solid mast raiser system may include a launcher coupled to the stanchion through a cable. Further, the launcher may be configured to raise and retract the stanchion. Further, the launcher may be configured to be affixed to the ground. Further, the launcher may comprise a first hole concentrically aligned with the slot.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
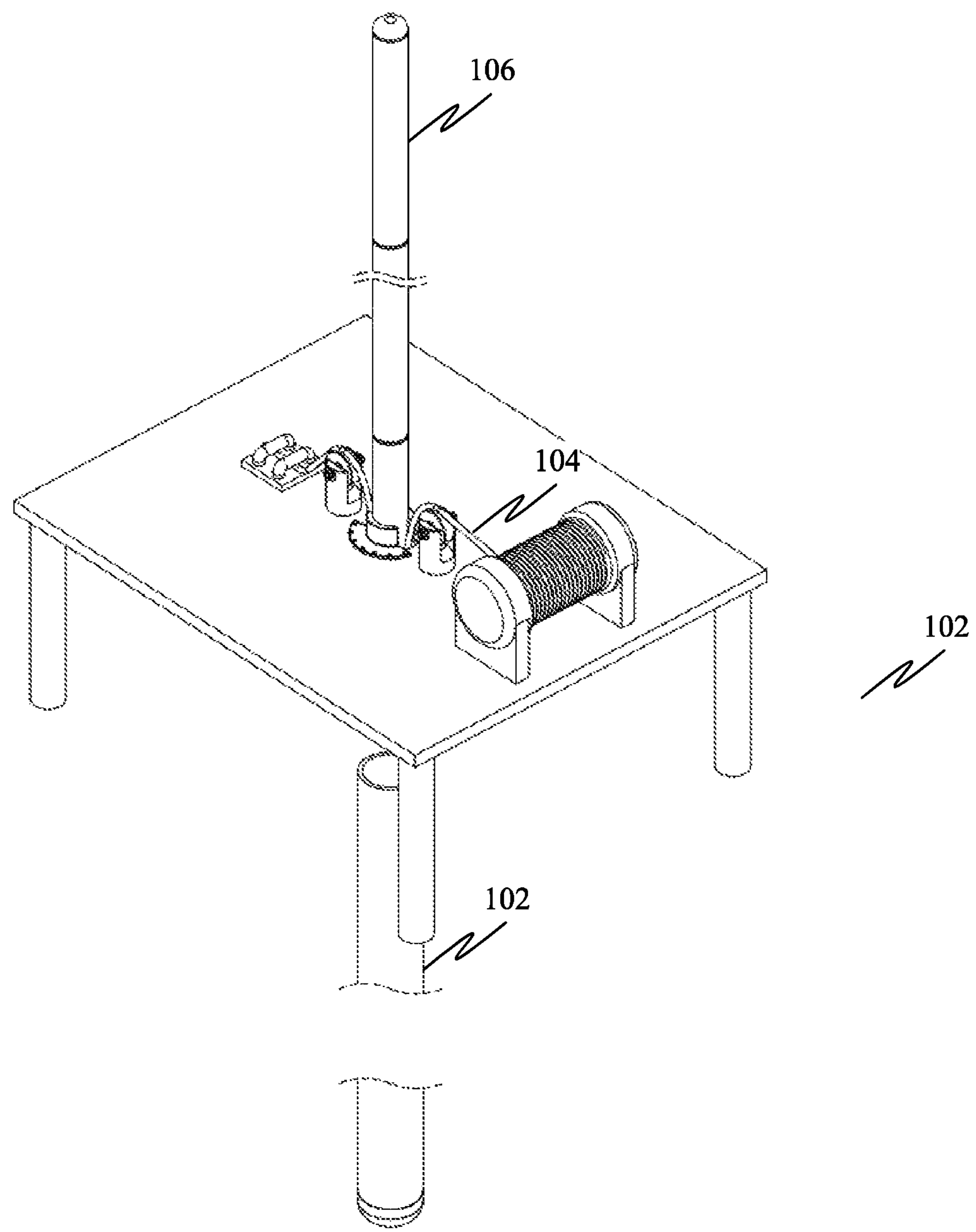
FIG. 1 is a top perspective view of a solid mast raiser system, in accordance with some embodiments.
Figure 2:
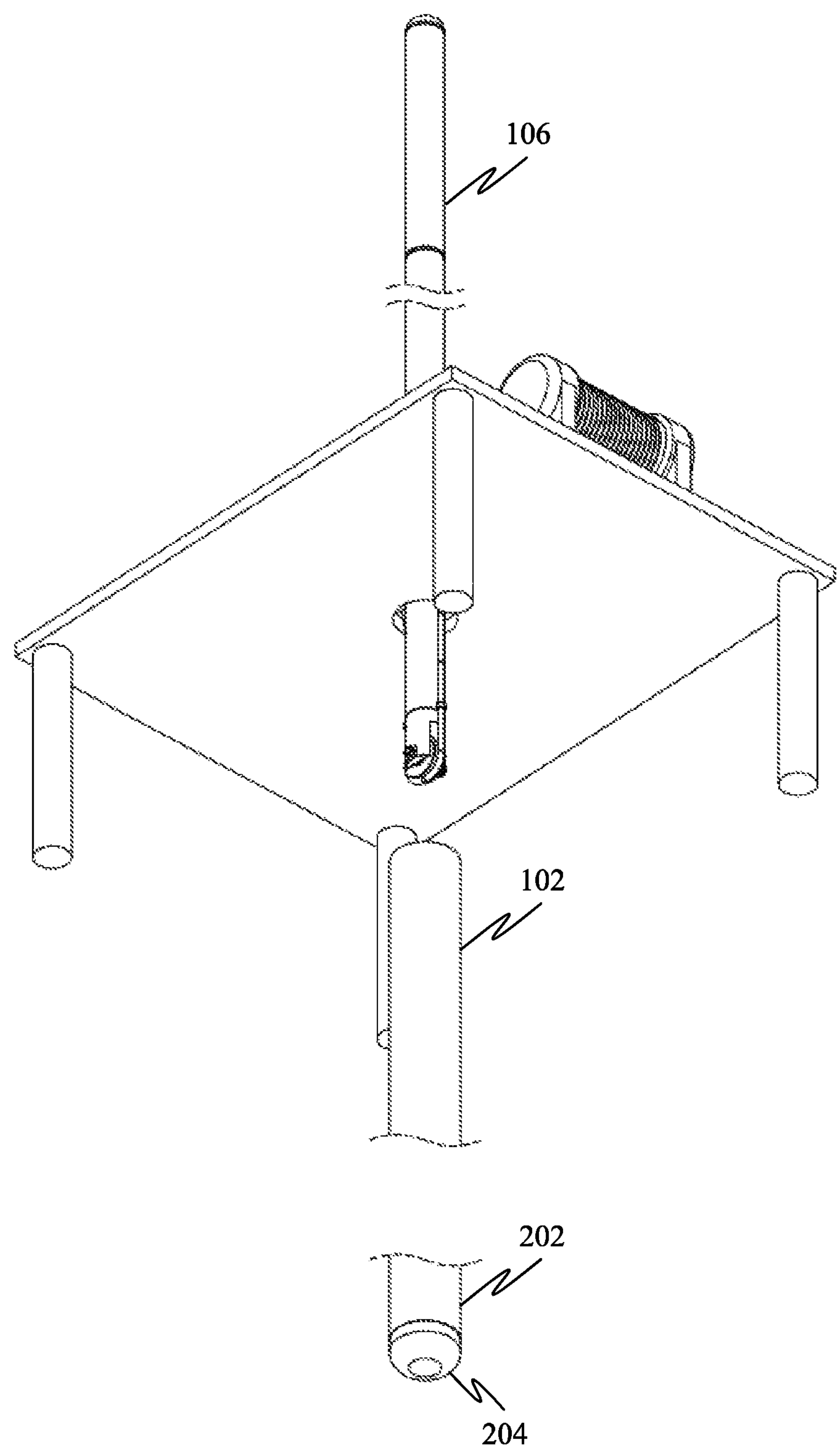
FIG. 2 is a bottom perspective view of a solid mast raiser system, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a solid mast raiser system, embodiments of the present disclosure are not limited to use only in this context.

Overview:

An objective of the present disclosure is to provide a cheaper, simpler, self-contained apparatus of bringing the user within easy reach of the top of the tower. Namely, by bringing retracting the mast low enough for service. The upright structure of the tower will retract into a pre-built channel beneath the surface of whatever terrain the disclosure is mounted above. The mechanism for raising and lowering the mast will be contained on a ground-level emplacement, where the mast is easily accessible and operable by even an unskilled user.

A solid mast raiser system described in the present disclosure aims to improve on retractable support mast systems known in the art. More specifically, the solid mast raiser system can be easily assembled and retracted/extended from a pre-drilled channel in the ground. The solid mast raiser system also allows the user to readily retract/extend the mast to service and/or inspect any device that may be mounted at the top without the use of additional tools and/or specialized vehicles. Additionally, the solid mast raiser system employs a fail-safe mechanism such that the support mast may be secured in the event that the retraction system fails.

The ability to retract the tower removes many difficulties with accessing complex devices in raised, difficult to reach areas. Such devices, especially those exposed to the elements or containing moving parts, need frequent maintenance to remain operational. This maintenance can be difficult and dangerous if performed in high places, resulting in more frequent and serious accidents and/or the need for special equipment and training to properly inspect and service the parts in question. Without the difficulty of reaching a raised, exposed area to impede work, services may be conducted much more quickly and cheaply. This allows for a more aggressive maintenance schedule of any mounted devices, while may prevent avoidable breakage and unnecessary downtime for the equipment.

The present disclosure describes a pylon assembly. More specifically, the pylon assembly is a solid mast raiser system that retracts and/or extends the mast inside of a pre-drilled bore in the ground.

Figure 7:
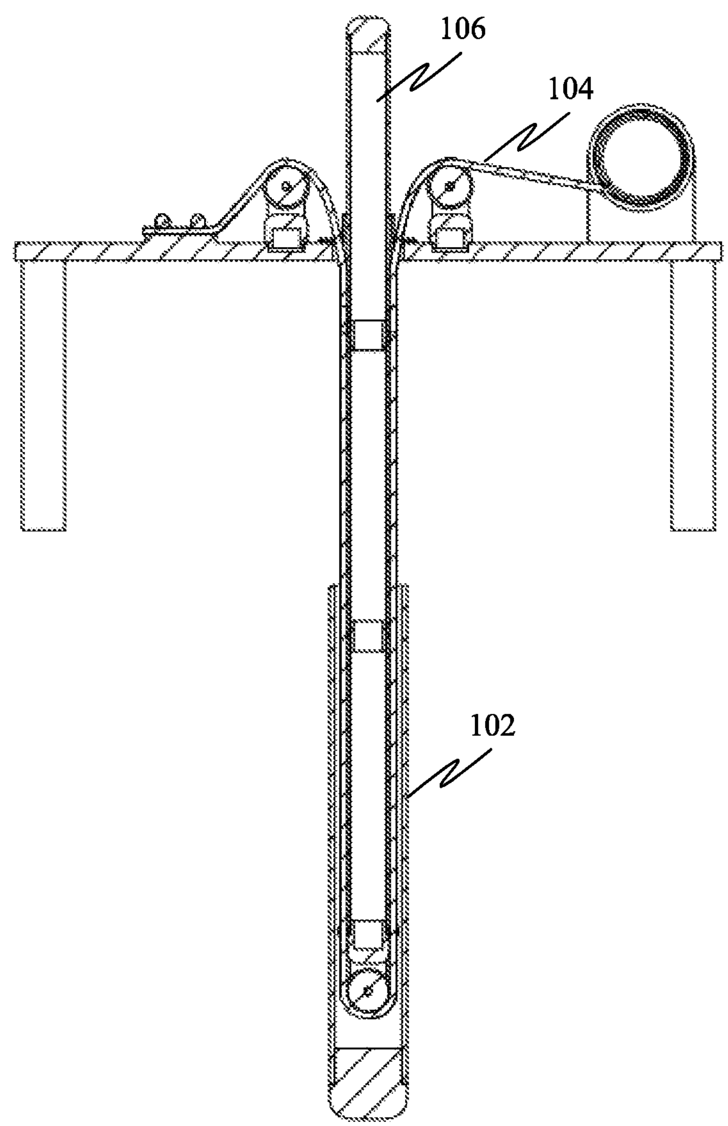
FIG. 7 is a cross-sectional view of a solid mast raiser system showing the retracted stanchion, in accordance with some embodiments.
Figure 8:
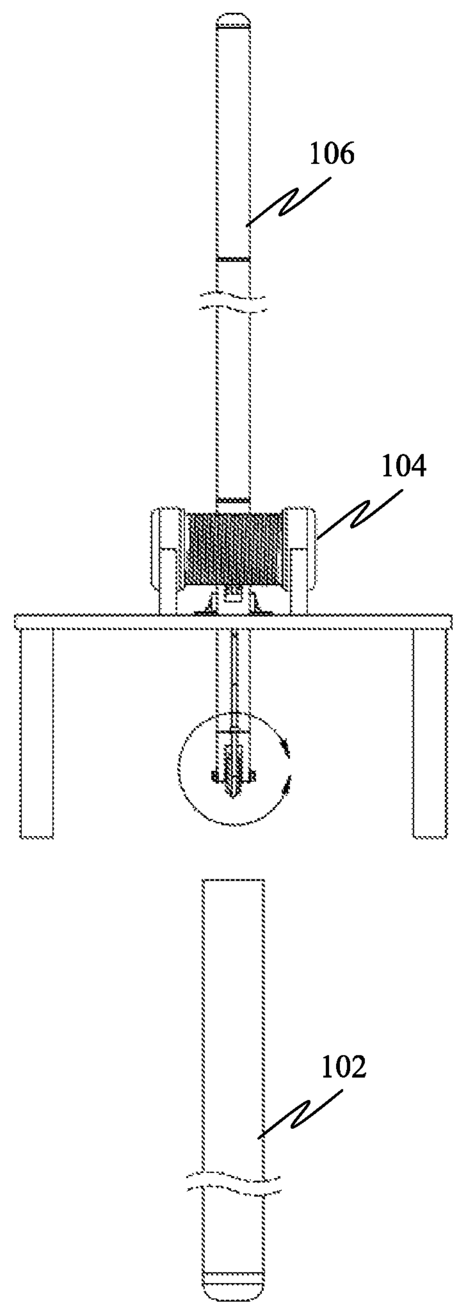
FIG. 8 is a side view of a solid mast raiser system, in accordance with some embodiments.

In an embodiment, as shown in FIG. 1 the pylon assembly includes a slot 102, a launcher 104, and a stanchion 106. In various embodiments, the pylon can be comprised of the second spud 1502, and a plurality of wires. Further, the slot 102 may be inserted into a predrilled bore in the ground. Further, the slot 102 may serve as a housing for the retracted stanchion 106, as shown in FIG. 7. In an embodiment, the slot 102 may be scaled to a desired length that may match a length of the pre-drilled bore in the ground. Further, the slot 102 may be comprised of a casing 202, and a cap 204. Further, the casing 202 may comprise an insert end of the slot 102. Additionally, the casing 202 may be adjacent to a base of the pre-drilled bore in the ground. In an embodiment, the casing 202 may traverse from the ground to the base of the pre-drilled bore in the ground. More specifically, the casing 202 may comprise a main body of the slot 102 that may secure and protect the stanchion 106 in the ground. Further, the cap 204 may be directly adjacent to the base of the pre-drilled bore in the ground. Additionally, the cap 204 may be fixed on to the end of the casing 202 that may be inserted in the predrilled bore first. Further, the cap 204 may be a plugged member that may secure the slot 102 from flooding from groundwater leakage. In another embodiment, the cap 204 may be employed on an opening near the ground surface to completely seal the slot 102 while the stanchion 106 is erected to prevent material from falling in to the slot 102. In another embodiment, the slot 102 may be comprised of a plurality of tubes. Further, the plurality of tubes may proceed after the casing 202. Further, the plurality of tubes may include a series of bore pipes that aligns and conforms to the casing 202 such that the plurality of tubes extends along a length of the casing 202.

Figure 3:
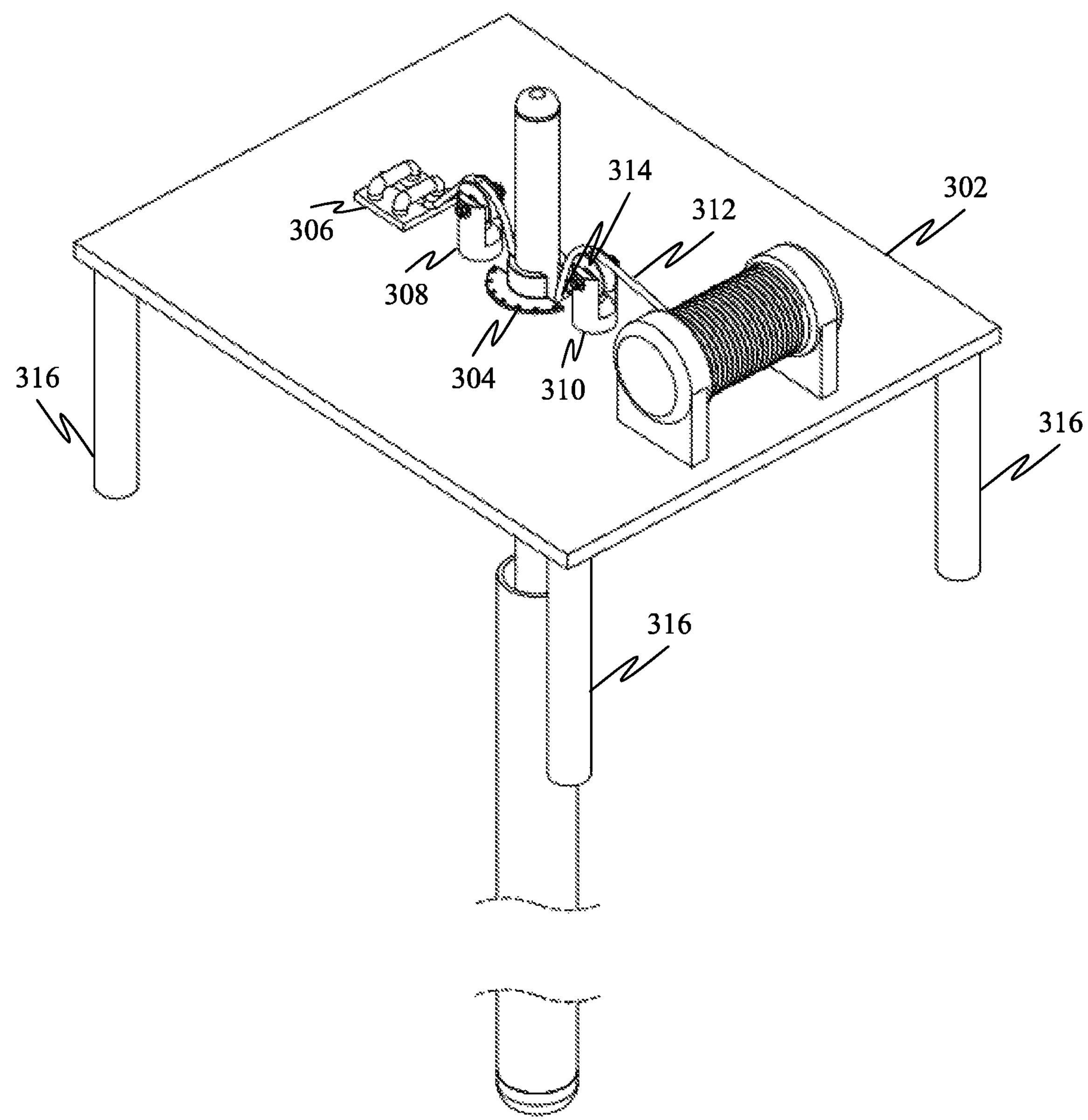
FIG. 3 is a top perspective view of a solid mast raiser system showing a retracted stanchion, in accordance with some embodiments.

Further, as shown in FIG. 3, the launcher 104 may be adjacent to the ground surface. Additionally, the launcher 104 may be concentrically aligned with the slot 102. Further, the launcher 104 may raise and/or retract the stanchion 106. Further, the launcher 104 may include a platform 302, a collar 304, an anchor 306, a first pulley 308, a second pulley 310, and a cable 312. Further, the platform 302 is aligned with the slot 102. Additionally, the platform 302 is projected above the ground surface. Further, the platform 302 may comprise a main body of the launcher 104 that and may serve as a main structural support piece in stabilizing and securing the stanchion 106 on the slot 102. Further, platform 302 may comprise a first hole 314, and a plurality of legs 316. Further, the first hole 314 may be concentrically aligned with the slot 102. Additionally, the first hole 314 may be mid-sectionally placed on the platform 302. Furthermore, the first hole 314 may traverse through the platform 302. More specifically, the first hole 314 may include an opening that may allow the stanchion 106 to traverse through the platform 302. Further, the plurality of legs 316 may be a series of stabilization members that may raise, level, and secure the platform 302 on to the ground. Further, the plurality of legs 316 may be fixed near corners of the platform 302. Additionally, the plurality of legs 316 may be embedded into the ground surface. Further, the plurality of legs 316 may be reinforced with additional materials, such as with steel, with concrete, and so on for extra stability. Further, the collar 304 may be placed around a perimeter of the first hole 314. Further, the collar 304 may include a fail-safe safety mechanism to prevent the stanchion 106 from freely slipping off the launcher 104 during breakage of a launcher 104 component. Further, the collar 304 may stabilize and reinforce the stanchion 106 on to the platform 302.

Figure 4:
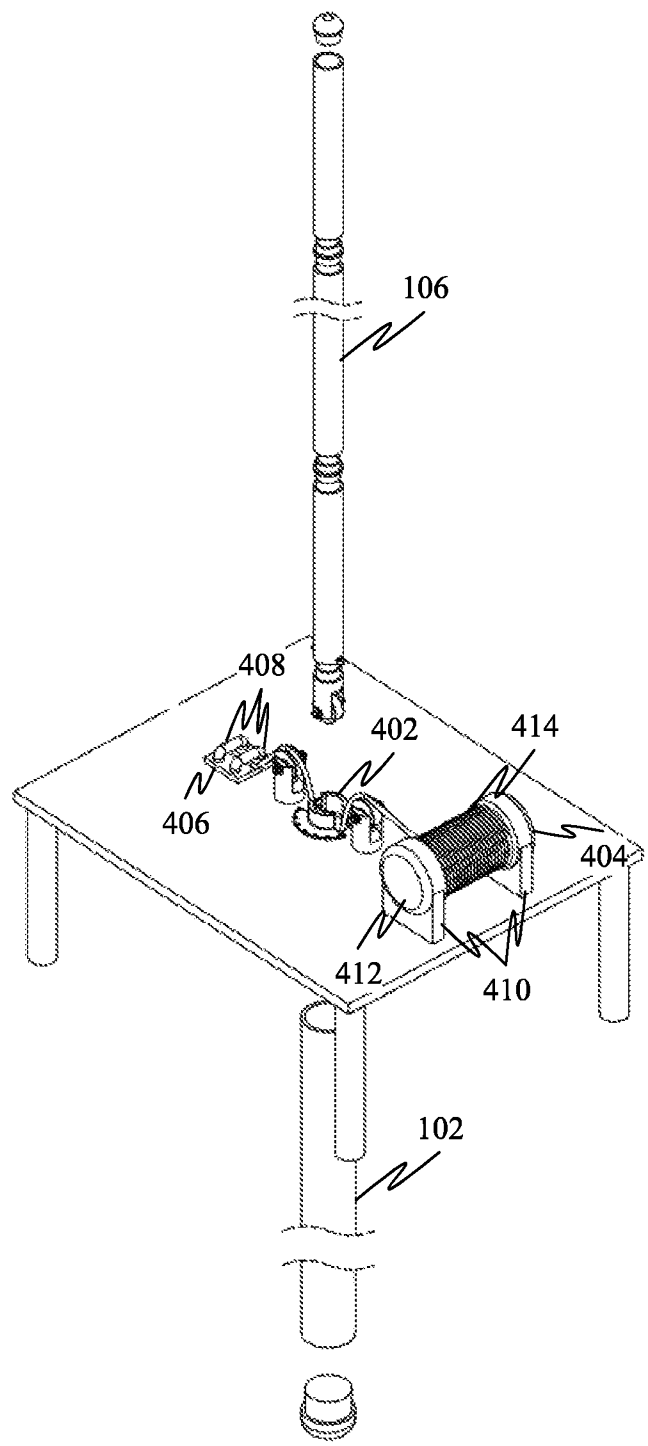
FIG. 4 is an exploded view of a solid mast raiser system, in accordance with some embodiments.
Figure 5:
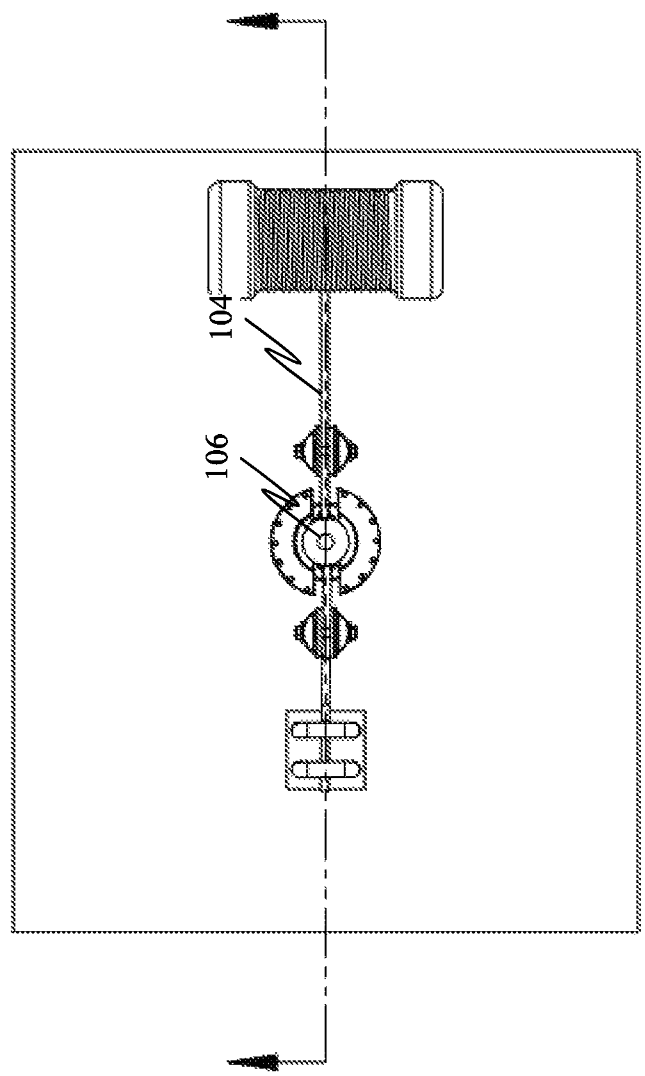
FIG. 5 is a top view of a solid mast raiser system, in accordance with some embodiments.
Figure 10:
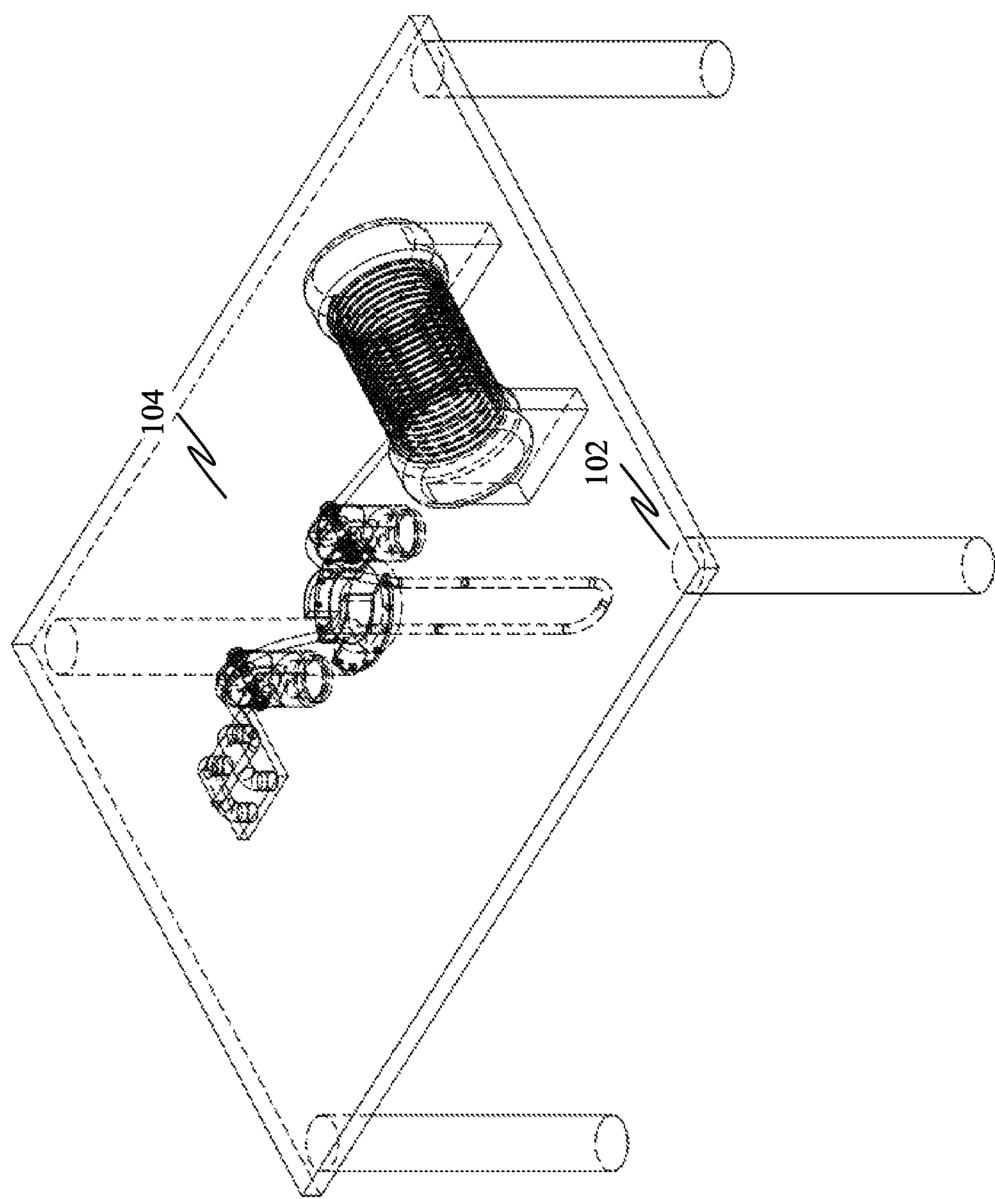
FIG. 10 is a perspective view of a launcher used in a solid mast raiser system, in accordance with some embodiments.

Further, as shown in FIG. 4, the collar 304 may include a lock 402, and a release. Further, the lock 402 may be located on the collar 304. Further, the lock 402 may employ a pipe slip grasping mechanism that prevents slippage of the stanchion 106 while raising or lowering due to breakage of a launcher 104 component. In an embodiment, the lock 402 may include a rotary slip lock 402 that may grip the stanchion 106 from free falling. Further, the release may be located on the collar 304. Further, the release may allow the lock 402 to disengage the stanchion 106 such that the stanchion 106 may be raised or lowered from the slot 102. In an embodiment, the release may include a rotary slip lock 402 release lever that disengages the lock 402 such that the stanchion 106 can be raised or lowered from the slot 102. Further, as shown in FIG. 4, the anchor 306 may be positioned adjacent to the collar 304, opposite to a winch 404. Additionally, the anchor 306 may be horizontally aligned with the collar 304. Further, the anchor 306 may be a securement member that fixes an end of the cable 312 on to the platform 302. Further, the anchor 306 may be comprised of a first brace 406, and a plurality of crimps 408. In reference to FIG. 10, the first brace 406 is fixed on to the first platform 302. Additionally, the first brace 406 is adjacent to the collar 304, opposite to the winch 404. Furthermore, the anchor 306 may be horizontally aligned with the collar 304. Further, the first brace 406 may include a mounting member that may removably attach the plurality of crimps 408. Additionally, the first brace 406 may align and secure the end of the cable 312 on to the first platform 302. Further, the plurality of crimps 408 may be fastened on to the first brace 406. Further, the plurality of crimps 408 may include an adjustable clamp may the end of the cable 312.

Further, the winch 404 may be fixed on to the first platform 302. Further, the winch 404 may be opposite to the anchor 306. Furthermore, the winch 404 may be horizontally aligned with the collar 304. Further, the winch 404 may be a movement member may raise and/or retract the stanchion 106. Further, in an embodiment, the winch 404 may include an electrically driven winch 404. Further, the winch 404 may include a plurality of second braces 410, a motor 412, a spool 414, and a controller. Further, the plurality of second braces 410 may be fixed on to the platform 302. Further, the plurality of second braces 410 may comprise a main body of the winch 404 that may secure and aligns the winch 404 on to the first platform 302 such that the winch 404 may extend and retract the stanchion 106 along the collar 304. Further, the spool 414 may traverse the plurality of second braces 410. Further, the spool 414 may serve as a cable 312 receptacle of the winch 404. Further, the motor 412 may be connected on to the spool 414 such that the spool 414 rotates along a turn direction of the motor 412. Further, the motor 412 may drive the spool 414 in a required direction to extend and/or retract the stanchion 106 in to the slot 102. Further, the controller may be connected to the motor 412. Further, the controller may serve as an electrical and/or circuit hub for the winch 404. Further, the controller allows a user to manipulate the motor 412 turn direction to extend and/or retract the winch 404. Further, the controller may comprise a switch and a power supply. Further, the switch may be connected to the controller. Further, the switch may include a user accessible manipulator that allows the user to manipulate the winch 404. Further, the power supply may be connected to the controller. Further, the power supply may regulate and distribute electrical energy to the winch 404.

Further, the first pulley 308 may be placed on the platform 302. Additionally, the first pulley 308 may be in between the anchor 306 and the collar 304. Furthermore, the first pulley 308 may be horizontally aligned with the collar 304 and the anchor 306. Further, the first pulley 308 may allow the cable 312 to roll freely on to the first platform 302 such that the stanchion 106 may be retracted/extended without cable 312 chafing and/or binding.

Figure 11:
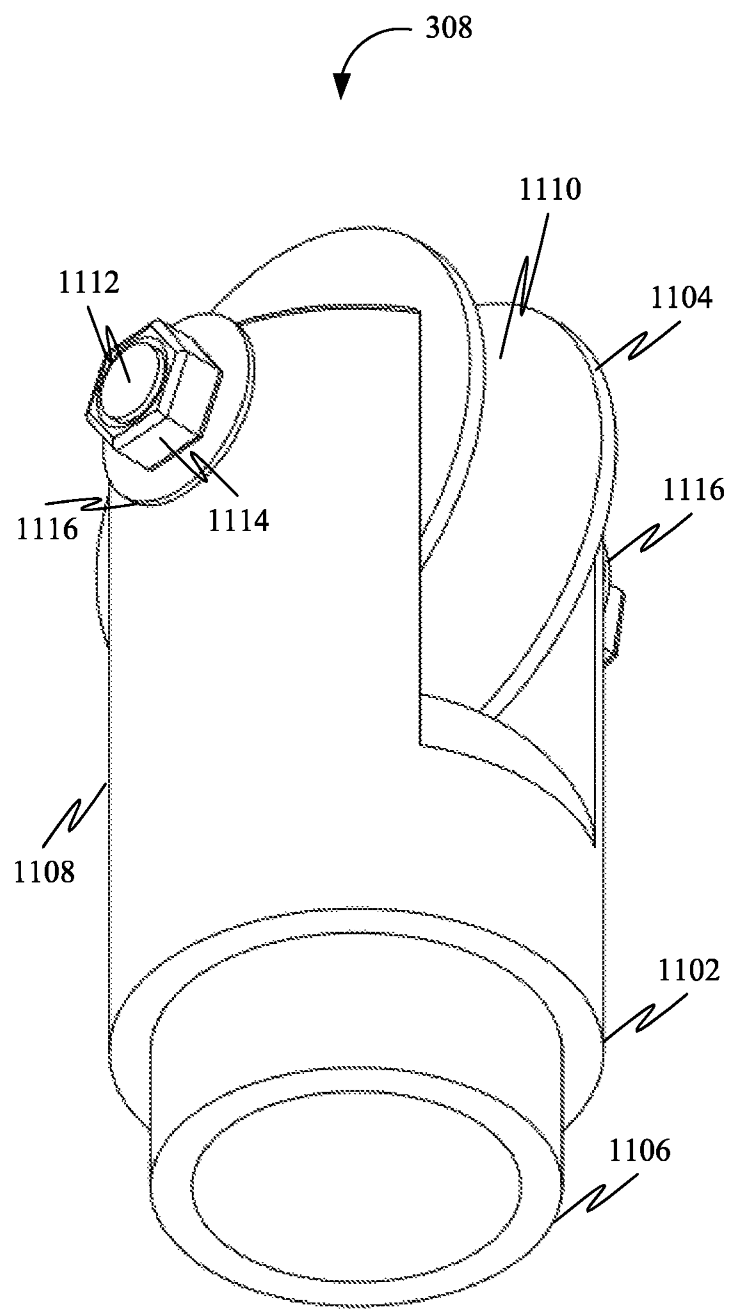
FIG. 11 is a perspective view of a first pulley, in accordance with some embodiments.
Figure 18:
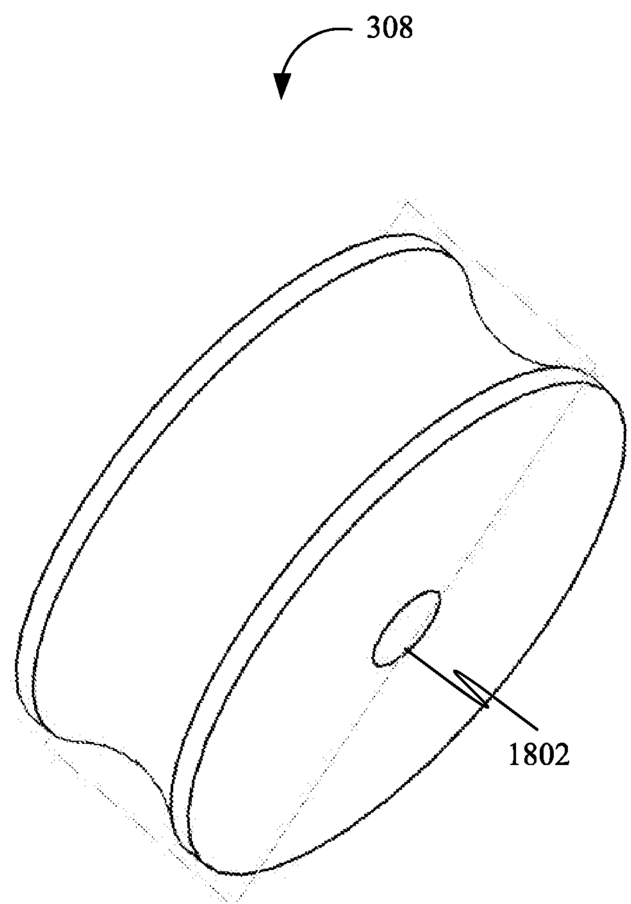
FIG. 18 is a perspective view of a first sheave, in accordance with some embodiments.
Figure 19:
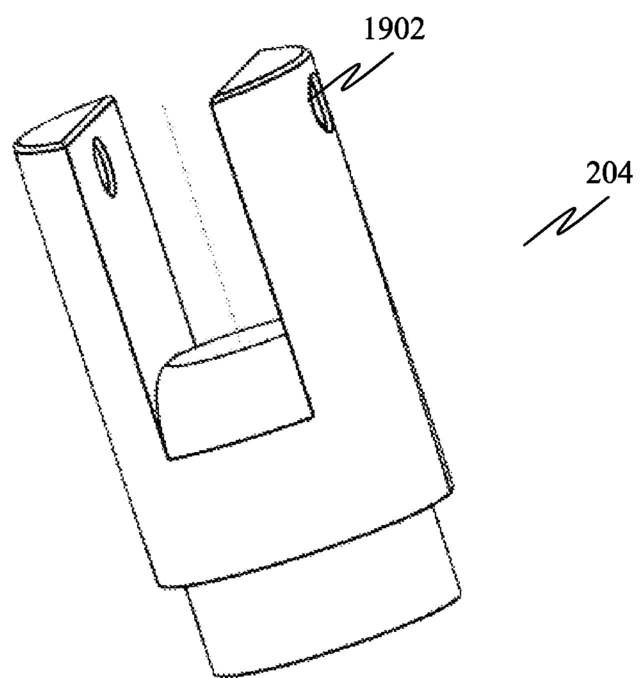
FIG. 19 is a perspective view of a first fork, in accordance with some embodiments.
Figure 21:
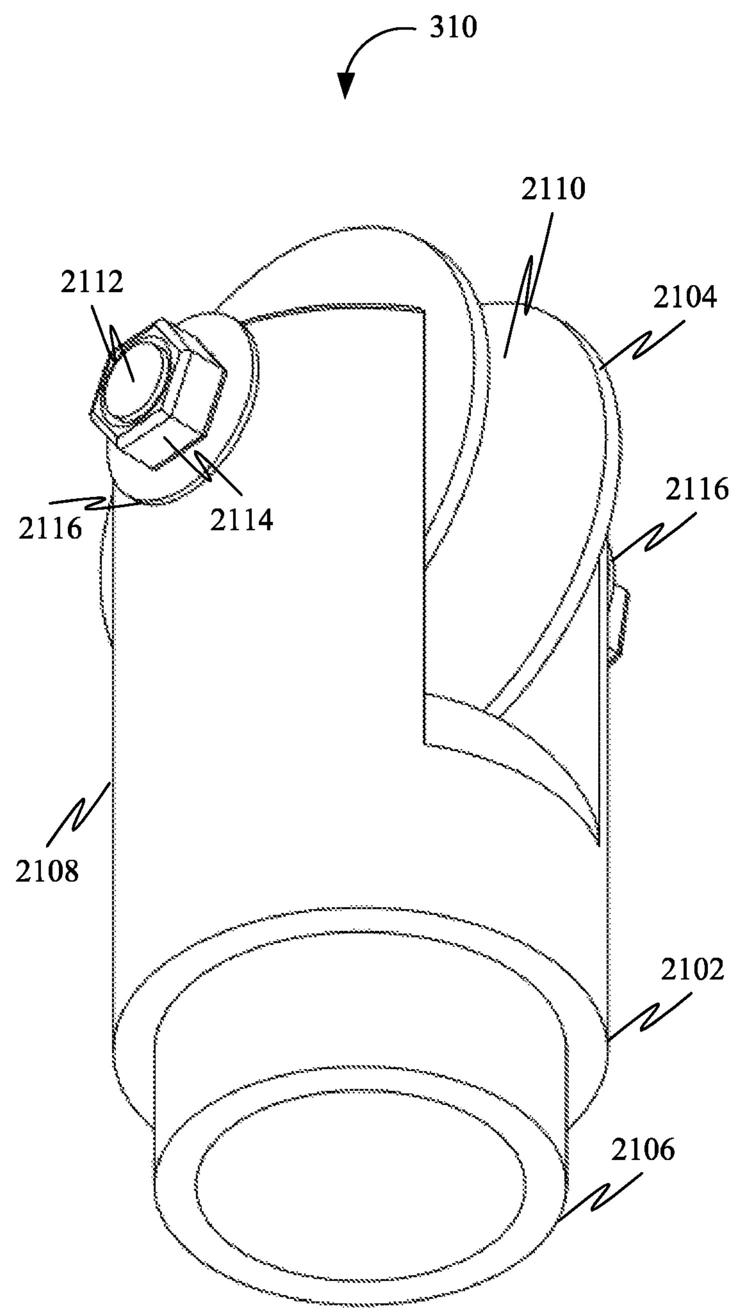
FIG. 21 is a perspective view of a second pulley, in accordance with some embodiments.

Further, as shown in FIG. 11, the first pulley 308 may comprise of a first bracket 1102, a first sheave 1104, and a first axle (not shown). Further, the first bracket may comprise a main chassis of the first pulley 308. More specifically, the first bracket may secure the first pulley 308 on to the platform 302. The first bracket may be further comprised of a first sleeve 1106, a first fork 1108, and a second hole 1902 as shown in FIG. 19. Further, the first sleeve may be directly fastened on to the first platform 302. Further, the first sleeve may serve as a connection member to secure the first bracket on to the first platform 302. Further, the first fork may be opposite to the first sleeve. Further, the first fork may serve as the housing for the first sheave. Further, the second hole may traverse the first fork. Additionally, the second hole may be mid-sectionally placed. Further, the second hole serves as a connection opening for the first axle. Further, the second hole may align to the first sheave on the first fork such the first sheave may be flushed and aligned. Further, the first sheave may reside in the first fork. Further, the first sheave may be concentrically aligned with the second hole. Further, the first sheave may allow the cable 312 to roll against the first pulley 308. Further, the first sheave may be comprised of a third hole 1802 (as shown in FIG. 18) and a first channel 1110. Further, the third hole may traverse the center of the first sheave. Additionally, the third hole may be concentrically aligned with the second hole. Further, the third hole may serve as a connection opening that may align the first sheave on to the first fork. Further, the first channel may be an inset around the perimeter of the first sheave. Further, the first channel may be a groove that may conform and mesh to a profile of the cable 312 such that the cable 312 may not de-rail off the first pulley 308. Further, the first axle may traverse from the second hole. Further, the first axle may be concentrically aligned with the third hole. Further, the first axle may secure the first sheave on to the first fork such that the first sheave can roll freely. Further, the first axle may comprise of a first head 1112, a first thread (not shown), a first nut 1114, and a plurality of first washers 1116. In reference to FIG. 11, the first head may be adjacent to the outside of the fork. Further, the first head may secure the first axle on to the first fork. In an embodiment, the first head may resemble a bolt head that may serve as a tightening member to removably fasten the first axle on to the first fork. Further, the first thread may be adjacent to the outside of the fork, opposite to the first head. Further, the first thread may serve as a fastening member that may secure the axle on to the first fork such that the first axle may be removably attached to the first fork. Further, the first nut may be concentrically aligned with the first thread. Further, the first nut may fasten and secure on to the first thread such that the axle may be removably fixed on to the first fork. Further, the plurality of first washers may be in between the first fork and the first sheave. Further, the plurality of first washers may be in between the first head and the first fork, and the first nut and the first fork. Further, the plurality of first washers may secure and protect the third hole and the second hole. Further, as shown in FIG. 21, the second pulley 310 may comprise of a second bracket 2102, a second sheave 2104, and a second axle (not shown). Further, the second bracket may comprise a main chassis of the second pulley 310. More specifically, the second bracket may secure the second pulley 310 on to the platform 302. The second bracket may be further comprised of a second sleeve 2106, a second fork 2108, and a fourth hole (not shown). Further, the second sleeve may be directly fastened on to the second platform 302. Further, the second sleeve may serve as a connection member to secure the second bracket on to the second platform 302. Further, the second fork may be opposite to the second sleeve. Further, the second fork may serve as the housing for the second sheave. Further, the fourth hole may traverse the second fork. Additionally, the fourth hole may be mid-sectionally placed. Further, the fourth hole serves as a connection opening for the second axle. Further, the fourth hole may align to the second sheave on the second fork such the second sheave may be flushed and aligned. Further, the second sheave may reside in the second fork. Further, the second sheave may be concentrically aligned with the fourth hole. Further, the second sheave may allow the cable 312 to roll against the second pulley 310. Further, the second sheave may be comprised of a fifth hole (not shown) and a second channel 2110. Further, the fifth hole may traverse the center of the second sheave. Additionally, the fifth hole may be concentrically aligned with the fourth hole. Further, the fifth hole may serve as a connection opening that may align the second sheave on to the second fork. Further, the second channel may be an inset around the perimeter of the second sheave. Further, the second channel may be a groove that may conform and mesh to a profile of the cable 312 such that the cable 312 may not de-rail off the second pulley 310. Further, the second axle may traverse from the fourth hole. Further, the second axle may be concentrically aligned with the fifth hole. Further, the second axle may secure the second sheave on to the second fork such that the second sheave can roll freely. Further, the second axle may comprise of a second head 2112, a second thread (not shown), a second nut 2114, and a plurality of second washers 2116. In reference to FIG. 21, the second head may be adjacent to the outside of the fork. Further, the second head may secure the second axle on to the second fork. In an embodiment, the second head may resemble a bolt head that may serve as a tightening member to removably fasten the second axle on to the second fork. Further, the second thread may be adjacent to the outside of the fork, opposite to the second head. Further, the second thread may serve as a fastening member that may secure the axle on to the second fork such that the second axle may be removably attached to the second fork. Further, the second nut may be concentrically aligned with the second thread. Further, the second nut may fasten and secure on to the second thread such that the axle may be removably fixed on to the second fork. Further, the plurality of second washers may be in between the second fork and the second sheave. Further, the plurality of second washers may be in between the second head and the second fork, and the second nut and the second fork. Further, the plurality of second washers may secure and protect the fourth hole and the fifth hole.

Further, the cable 312 may traverse from the spool 414 to the anchor 306. More specifically, the cable 312 routes from the winch 404 to the second channel. The cable 312 may then traverse from the second channel to the first hole 314. Further, the cable 312 may traverse the bottom of the stanchion 106, and up to the first channel shown in FIG. 6 and FIG. 7. The cable 312 wraps around the first channel and is clamped down on the plurality of crimps 408 of the anchor 306. Further, the cable 312 may serve as a bridging member that extends and/or retracts the stanchion 106 in to the slot 102. Further, the stanchion may be concentrically aligned with the slot 102 and the first hole 314 of the platform 302. Additionally, the stanchion 106 may rest upon the cable 312. Further, the stanchion 106 may include a solid mast member that extends and/or retracts from the slot 102. In an embodiment, the stanchion 106 may be incorporated in wind turbine applications, where the connected media on top of the stanchion 106 may be easily serviced by the user retracting the stanchion 106 inside of the slot 102. Further, the stanchion 106 may be comprised of a third pulley 902, the first pipe 1202, a plurality of first spuds 1302, a plurality of second pipes, including a second pipe 1402, a second spud 1502, and a plurality of wires.

Figure 9:
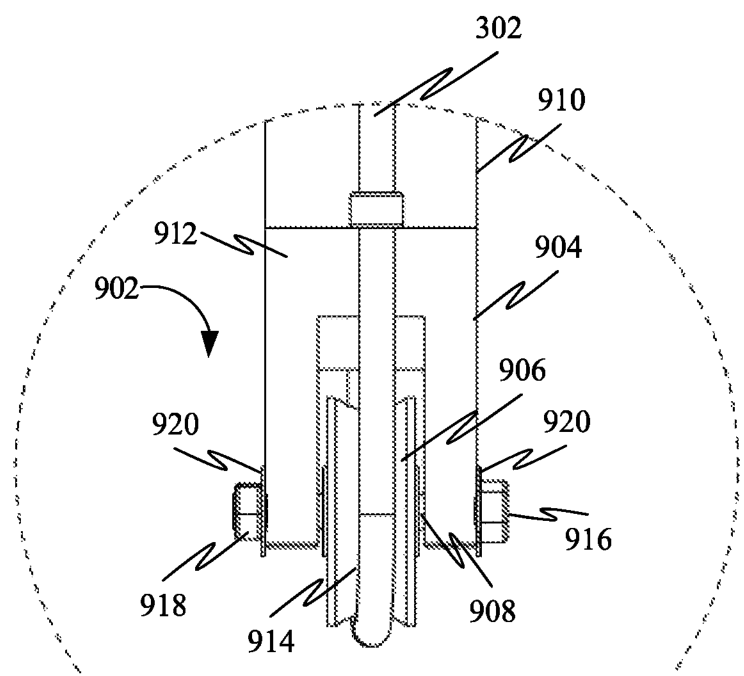
FIG. 9 is a perspective view of a solid mast raiser system showing the third pulley at the bottom of the stanchion, in accordance with some embodiments.

As shown in FIG. 9, the third pulley 902 may be directly adjacent to the cable 312. Additionally, the third pulley 902 may be concentrically aligned with the slot 102 and the collar 304. Further, the third pulley 902 may resemble the first pulley 308 and the third pulley 902, and may where allows the cable 312 to roll freely on to the stanchion 106 without the cable 312 chafing and/or binding on the bottom of the stanchion 106.

Further, the third pulley 902 may comprise of a third bracket 904, a third sheave 906, and a third axle 908. Further, the third bracket 904 may be a main chassis of the third pulley 902. More specifically, the third bracket 904 may secure the third pulley 902 on to the platform 302. The third bracket 904 may be further comprised of a third sleeve 910 a third fork 912, and a sixth hole (not shown). Further, the third sleeve 910 may be directly fastened on to the first platform 302. Further, the third sleeve 910 may serve as a connection member to secure the third bracket 904 on to the first platform 302. Further, the third fork 912 may be opposite to the third sleeve 910. Further, the third fork 912 may serve as the housing for the third sheave 906. Further, the sixth hole may traverse the third fork 912. Additionally, the sixth hole may be mid-sectionally placed. Further, the sixth hole serves as a connection opening for the third axle 908. Further, the sixth hole may align to the third sheave 906 on the third fork 912 such the third sheave 906 may be flushed and aligned. Further, the third sheave 906 may reside in the third fork 912. Further, the third sheave 906 may be concentrically aligned with the sixth hole. Further, the third sheave 906 may allow the cable 312 to roll against the third pulley 902. Further, the third sheave 906 may be comprised of a seventh hole (not shown) and a third channel 914. Further, the seventh hole may traverse the center of the third sheave 906. Additionally, the seventh hole may be concentrically aligned with the sixth hole. Further, the seventh hole may serve as a connection opening that may align the third sheave 906 on to the third fork 912. Further, the third channel may be an inset around the perimeter of the third sheave 906. Further, the third channel may be a groove that may conform and mesh to a profile of the cable 312 such that the cable 312 may not de-rail off the third pulley 902. Further, the third axle 908 may traverse from the sixth hole. Further, the third axle 908 may be concentrically aligned with the seventh hole. Further, the third axle 908 may secure the third sheave 906 on to the third fork 912 such that the third sheave 906 can roll freely. Further, the third axle 908 may comprise of a third head 916, a third thread (not shown), a third nut 918, and a plurality of third washers 920. In reference to FIG. 11, the third head 916 may be adjacent to the outside of the fork. Further, the third head 916 may secure the third axle 908 on to the third fork 912. In an embodiment, the third head 916 may resemble a bolt head that may serve as a tightening member to removably fasten the third axle 908 on to the third fork 912. Further, the third thread may be adjacent to the outside of the fork, opposite to the third head 916. Further, the third thread may serve as a fastening member that may secure the axle on to the third fork 912 such that the third axle 908 may be removably attached to the third fork 912. Further, the third nut 918 may be concentrically aligned with the third thread. Further, the third nut 918 may fasten and secure on to the third thread such that the axle may be removably fixed on to the third fork 912. Further, the plurality of third washers 920 may be in between the third fork 912 and the third sheave 906. Further, the plurality of third washers 920 may be in between the third head 916 and the third fork 912, and the third nut 918 and the third fork 912. Further, the plurality of third washers 920 may secure and protect the sixth hole and the seventh hole.

Figure 6:
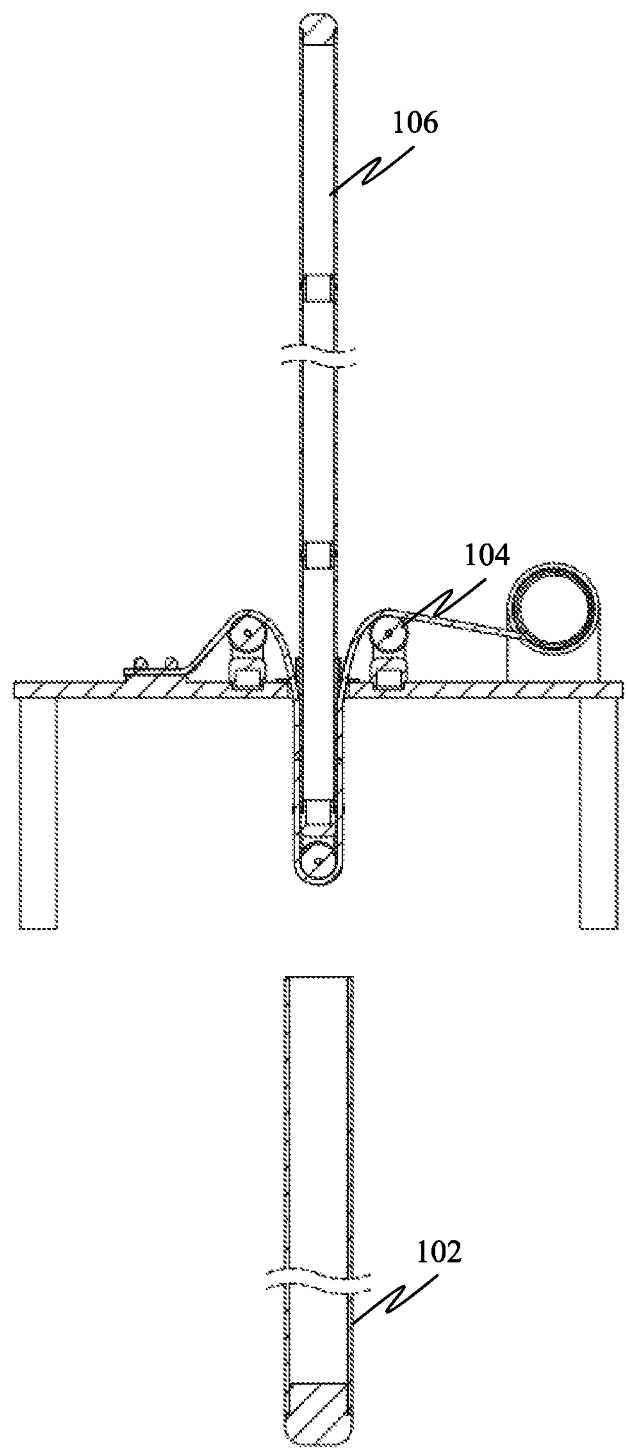
FIG. 6 is a cross-sectional view of a solid mast raiser system showing the extended stanchion, in accordance with some embodiments.
Figure 12:
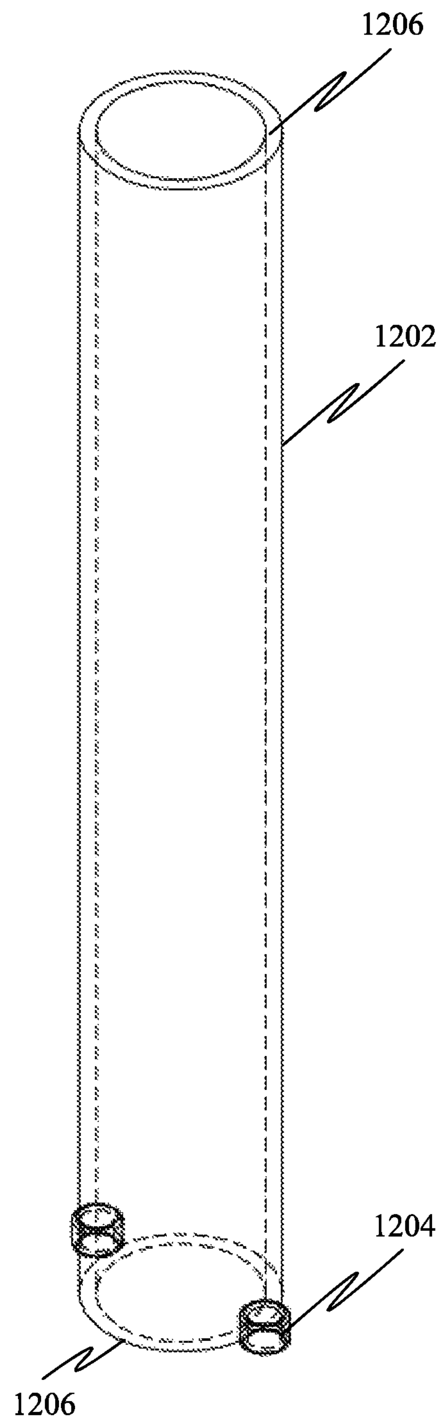
FIG. 12 is a perspective view of a first pipe used in a solid mast raiser system, in accordance with some embodiments.
Figure 13:
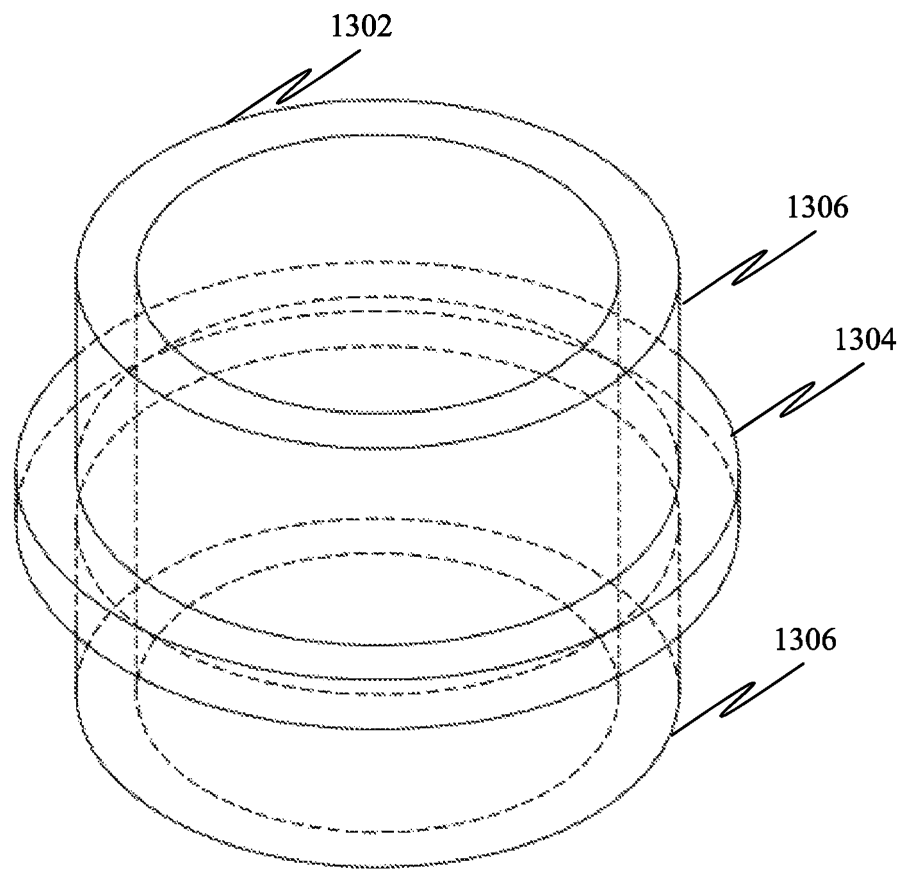
FIG. 13 is a perspective view of a first spud used in a solid mast raiser system, in accordance with some embodiments.
Figure 14:
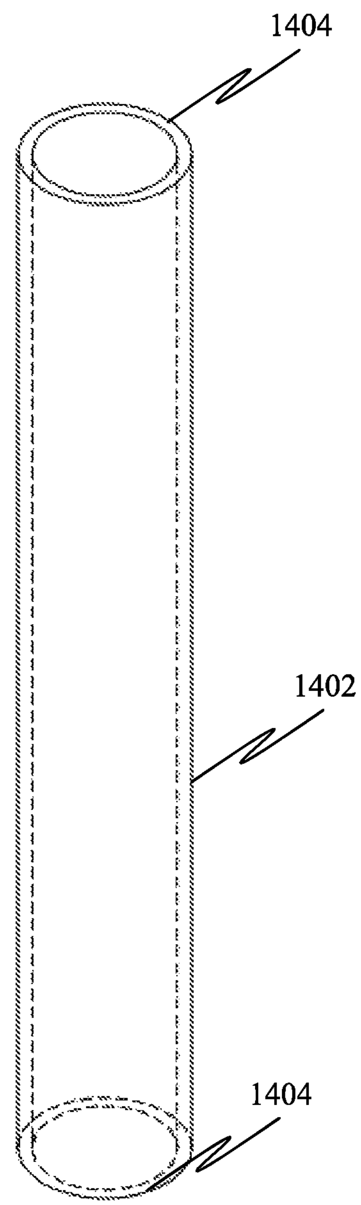
FIG. 14 is a perspective view of a second pipe used in a solid mast raiser system, in accordance with some embodiments.
Figure 20:
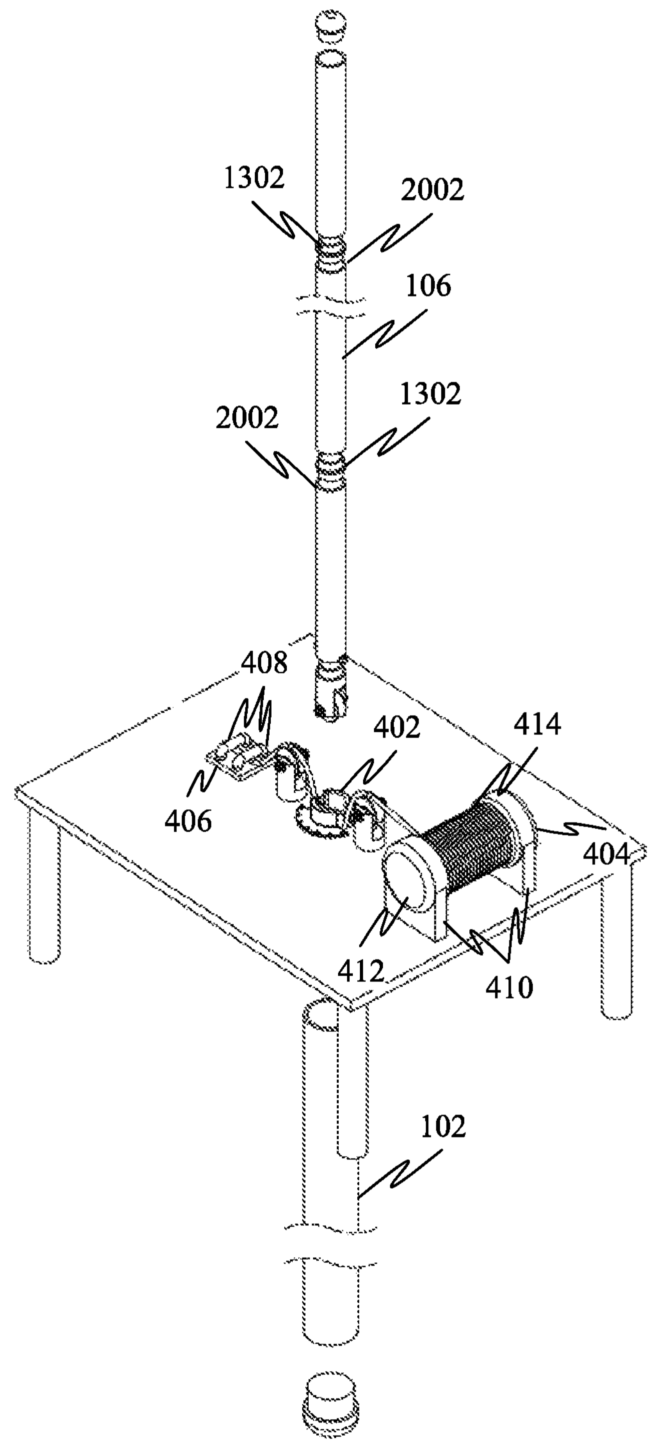
FIG. 20 is a top perspective view of a solid mast raiser system including a plurality of extension joints, in accordance with some embodiments.

In reference to FIG. 12, the first pipe 1202 may be adjacent to the third pulley 902. Additionally, the first pipe 1202 may be concentrically aligned with the slot 102 and the collar 304. Furthermore, the first pipe 1202 may be fastened on to the cable 312. More specifically, the first pipe 1202 may be a foundation of the stanchion 106. In an embodiment, the first pipe 1202 may be housed inside of the slot 102 in its extended position, further securing the stanching from buckling/bending. In another embodiment, the first pipe 1202 can be lifted up to expose the slot 102, such that it can be covered with the cap 204. The first pipe 1202 may comprise of a plurality of first guides 1206, and a plurality of eyelets 1204. In reference to FIG. 12, the plurality of first guides 1206 may be incorporated on the ends of the first pipe 1202. More specifically, the plurality of first guides 1206 may serve as connection points where the third pulley 902 can be fixed, and to allow the first pipe 1202 to be extended. In reference to FIG. 12, the plurality of eyelets 1204 may be located near the third pulley 902. Additionally, the plurality of eyelets 1204 may horizontally align the first pulley 308 and the second pulley 310. Furthermore, the cable 312 traverse through the plurality of eyelets 1204 as shown in FIG. 6 and FIG. 7. More specifically, the plurality of eyelets 1204 may be a series of cable bushings that secure the cable 312 on to the first pipe 1202. Additionally, the plurality of eyelets 1204 may route the cable 312 to the third pulley 902 such that the stanchion 106 may be lowered in to the slot 102 as shown in FIG. 7. As shown in FIG. 13, the plurality of first spuds 1302 may be positioned on the end of the first pipe 1202, opposite to the third pulley 902. Additionally, the plurality of first spuds 1302 is located on a plurality of extension joints 2002, as shown in FIG. 20, to allow the first pipe 1202 to be extended. More specifically, the plurality of spuds may comprise a connector member that may secure the first pipe 1202 on to the plurality of second pipes. In an embodiment, the plurality of first spuds 1302 may be initially fastened on to the first pipe 1202 and the second pipe, and may then be permanently fixed to create a solid mast stanchion 106 of any length. The plurality of first spuds 1302 is comprised of a ridge 1304, and a plurality of fittings 1306. In reference to FIG. 13, the ridge 1304 is the central body of the plurality of first spuds 1302. More specifically, the ridge 1304 is a protrusion that conforms to the thickness of the first pipe 1202 and the second pipe. In an embodiment, a joint between the ridge 1304 and the first pipe 1202 and/or the plurality of second pipes may be permanently fixed to create the stanchion 106. Further, the plurality of fittings 1306 may be located on both sides of the ridge 1304. Further, the plurality of fittings 1306 may comprise a fastener member that may conform and slip in to an inner diameter of the first pipe 1202 and/or plurality of second pipes. FIG. 14 shows an exemplary second pipe 1402 1402. Further, the plurality of second pipes may proceed after the first pipe 1202 to the collar 304 end. More specifically, the plurality of second pipes may serve as stanchion 106 extension members. In an embodiment, the plurality of second pipes may extend to a slot 102 length as shown in FIG. 7.

The second pipe 1402 may be further comprised of a plurality of second guides 1404. Further, the plurality of second guides 1404 may be located on both ends of the second pipe. Further, the plurality of second guides 1404 may resemble the plurality of first guides 1206, where the plurality of second guides 1404 may conform and mesh with the plurality of first spuds 1302 such that the second pipe 1402 may stack up the first pipe 1202.

Figure 15:
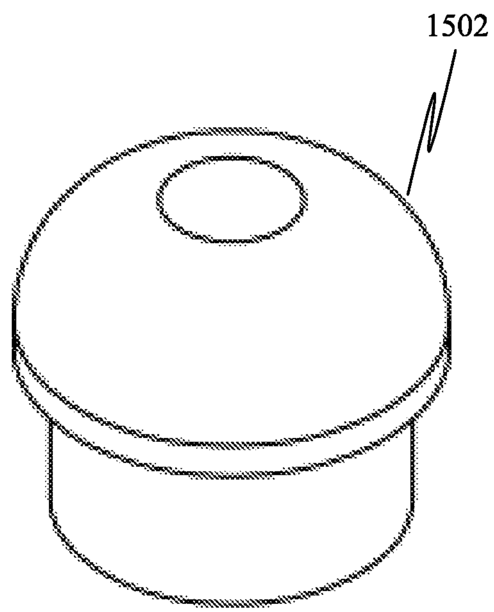
FIG. 15 is a perspective view of a second spud used in a solid mast raiser system, in accordance with some embodiments.
Figure 16:
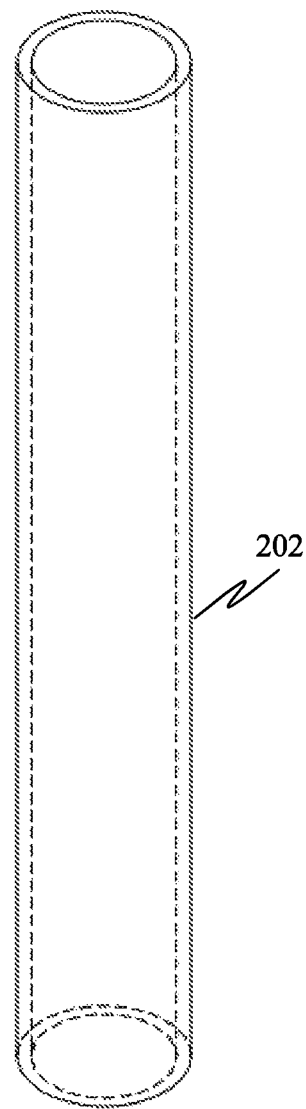
FIG. 16 is a perspective view of a casing used in a solid mast raiser system, in accordance with some embodiments.
Figure 17:
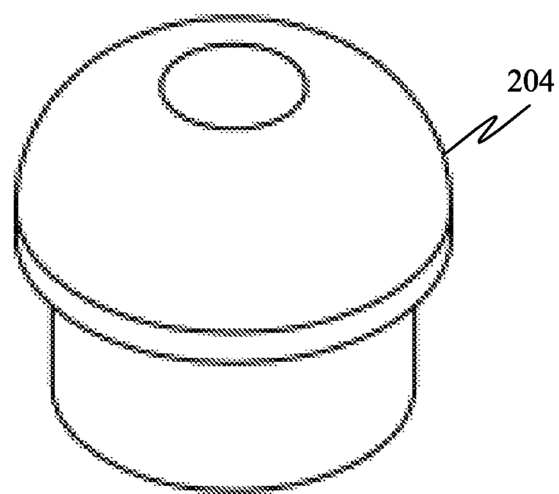
FIG. 17 is a perspective view of a cap used in a solid mast raiser system, in accordance with some embodiments.

As shown in FIG. 15, the second spud 1502 may be located on the top of the stanchion 106. Further, the second spud 1502 may be a peak connector member that may cover a hollow profile of the stanchion 106. In an embodiment, the second spud 1502 may take include a mounting member for a wind turbine gearbox, a cable 312 flag anchor 306, or may serve as a mounting member to secure any mounting media of desired usage.

Further, the plurality of wires may be outfitted on to the stanchion 106. Further, the plurality of wires may include any additional reinforcement means to reinforce and secure the extended stanchion 106. In an embodiment, the plurality of wires may take the form of a guy wire system where the guy wire system may be mounted on the ground and the stanchion 106. In another embodiment, the platform 302 may further comprise of mounting points that allow the plurality of wires to secure on to the platform 302 and the stanchion 106.

What is claimed is:

1. A solid mast raiser system comprising:

a slot, wherein the slot is configured to be inserted in to a predrilled bore in a ground, wherein a length of the slot is configured to be matched to a depth of the predrilled bore in the ground;

a stanchion configured to be attached to the slot, wherein the stanchion is concentrically aligned with the slot, wherein the stanchion rests upon a cable; and a launcher coupled to the stanchion through the cable, wherein the launcher is configured to raise and retract the stanchion, wherein the launcher is configured to be affixed to the ground, wherein the launcher comprises a first hole concentrically aligned with the slot.

2. The solid mast raiser system of claim 1, wherein the slot comprises:

a casing comprising a main body of the slot, wherein the casing comprises an insert end and a bottom end; and a cap configured to be attached to the casing at the bottom end.

3. The solid mast raiser system of claim 1, wherein the launcher further comprises:

a platform comprising a structural support piece configured for stabilizing and securing the stanchion on the slot, wherein platform is aligned with the slot, wherein the platform is configured to be projected above the ground;

a collar placed around a perimeter of the first hole, wherein the collar is configured to stabilize and reinforce the stanchion on to the platform, wherein the collar is configured to prevent the stanchion from freely slipping off the launcher upon a failure of a component of the launcher;

an anchor comprising a securement member configured to fix a first end of the cable on to the platform, wherein the anchor is positioned adjacent to the collar and opposite to a winch, wherein the anchor is horizontally aligned with the collar;

a first pulley placed on the platform, wherein the first pulley is configured to receive the cable and allow the cable to roll freely on to the platform while the stanchion is retracted or extended, wherein the first pulley is placed in between the anchor and the collar, wherein the first pulley is horizontally aligned with the collar and the anchor;

a second pulley placed on the platform, wherein the first pulley is configured to receive the cable and allow the cable to roll freely on to the platform while the stanchion is retracted or extended, wherein the second pulley is placed between the anchor and the collar, opposite to the first pulley, wherein the second pulley is horizontally aligned with the collar and the anchor;

the cable configured to serve as a bridging member that extends or retracts the stanchion, wherein the cable traverses from a spool to the anchor; and the winch placed on the platform, wherein the winch is adjacent to the second pulley, and is opposite to the anchor, wherein the winch is horizontally aligned with the collar, wherein the winch is configured to extend or retract the stanchion in relation to the slot.

4. The solid mast raiser system of claim 3, wherein the winch is an electrically driven winch.

5. The solid mast raiser system of claim 3, wherein the winch comprises:

a plurality of braces, wherein the plurality of braces are fixed on to the platform, wherein the plurality of braces are configured to secure and align the winch on to the platform;

a spool traversing the plurality of braces, wherein the spool is configured to serve as a cable receptacle of the winch;

a motor rotatably coupled to the spool, wherein the motor is configured to rotate the spool along a turn direction of the motor, wherein the motor is configured to drive the spool in an appropriate direction to extend or retract the stanchion in relation to the slot.

6. The solid mast raiser system of claim 3, wherein the stanchion further comprises:

a third pulley to receive the cable and allow the cable to roll freely on to the stanchion, wherein the third pulley is concentrically aligned with the slot and the collar;

a first pipe adjacent to the third pulley, wherein first pipe is the foundation of the stanchion, wherein the first pipe is concentrically aligned with the slot and the collar, wherein the first pipe is fastened on to the cable, wherein the first pipe is housed inside of the slot in its extended position;

a plurality of first spuds positioned on an end of the first pipe, opposite to the third pulley, wherein the plurality of first spuds is located on a plurality of extension joints, wherein the plurality of spuds comprises a connector member configured to secure the first pipe on to a plurality of second pipes;

a plurality of second pipes proceeding after the first pipe to a collar end, wherein the plurality of second pipes are configured to serve as stanchion extension members, wherein the plurality of second pipes extend to the length of the slot; and a second spud comprising a peak connector member configured to cover a hollow profile of the stanchion.

7. The solid mast raiser system of claim 6, the plurality of first spuds is initially fastened on to the first pipe and the second pipe, wherein jointed members are then permanently fixed to form the stanchion of a predetermined length.

8. The solid mast raiser system of claim 6, wherein the second spud is configured to serve as a mounting member to secure a mounting media of desired usage.

9. The solid mast raiser system of claim 1, wherein a platform further comprises a plurality of legs configured to raise and secures the platform on to the ground, wherein the plurality of legs are fixed near the corners of the platform.

10. The solid mast raiser system of claim 1, wherein a plurality of legs are configured to be embedded into the ground and are configured to be reinforced with concrete.

11. The solid mast raiser system of claim 1, wherein the first hole is configured to allow the stanchion to traverse through a platform, wherein the first hole is concentrically aligned with the slot, wherein, the first hole is mid-sectionally placed on the platform, wherein the first hole traverses through the platform.

12. The solid mast raiser system of claim 6, wherein the collar comprises:

a lock located on the collar, wherein the lock employs a pipe slip grasping mechanism that prevents the stanchion from slipping freely in an event of a launcher component breakage, wherein the lock comprises a rotary slip lock that grips the stanchion from free falling, wherein the release is located on the collar; and a release configured to allow the lock to disengage the stanchion such that the stanchion can be extended or retracted in relation to the slot, wherein the release comprises a rotary slip lock release lever that disengages the lock such that the stanchion can be extended or retracted.

13. The solid mast raiser system of claim 3, wherein the anchor comprises:

a fixed on to the platform, wherein the first brace is adjacent to the collar, opposite to the winch, wherein the anchor is horizontally aligned with the collar, wherein the brace is a mounting member that removably attaches a plurality of crimps, wherein the brace aligns and secures the first end of the cable on to the platform; and the plurality of crimps, wherein the plurality of crimps is fastened on to the brace, wherein the plurality of crimps is an adjustable clamp that grasps the first end of the cable.

14. The solid mast raiser system of claim 3, wherein the first pulley comprises:

a first bracket constituting the main chassis of the first pulley, wherein the first bracket secures the first pulley on to the platform; and a first sheave configured to allow the cable to roll against the first pulley, wherein the first sheave resides in a first fork, wherein the first sheave is concentrically aligned with a second hole;

a first axle configured to secure the first sheave on to the first fork such that the first sheave can roll freely, wherein the first axle traverses from the second hole, wherein the first axle is concentrically aligned with a third hole.

15. The solid mast raiser system of claim 3, wherein the second pulley is comprised of:

a second bracket constituting a main chassis of the second pulley, wherein the second bracket secures the second pulley on to the platform;

a second sheave configured to allow the cable to roll against the second pulley, wherein the second sheave resides in a second fork, wherein the second sheave is concentrically aligned with a fourth hole;

a second axle configured to secure the second sheave on to the second fork such that the second sheave can roll freely, wherein the second axle traverses from the fourth hole, wherein the second axle is concentrically aligned with a fifth hole.

16. The solid mast raiser system of claim 3, wherein the winch is fixed on to the platform, wherein the winch is adjacent to the second pulley, and opposite to the anchor, wherein the winch is horizontally aligned with the collar, wherein the winch is a movement member configured to extend or retract the stanchion.

17. The solid mast raiser system of claim 6, wherein the third pulley comprises:

a third bracket constituting a main chassis of the third pulley, wherein the third bracket is configured to secure the third pulley on to the first pipe;

a third sheave configured to allow the cable to roll against the third pulley, wherein the third sheave resides in a third fork, wherein the third sheave is concentrically aligned with a sixth hole;

a third axle configured to secure the third sheave on to the third fork such that the third sheave can roll freely, wherein the third axle traverses from the sixth hole, wherein the third axle is concentrically aligned with the seventh hole.

18. The solid mast raiser system of claim 6, wherein the first pipe comprises:

a plurality of first guides serving as connection points for fixing the third pulley, wherein the plurality of first guides is incorporated on the ends of the first pipe, wherein a second connection point of the first pipe allows the first pipe to be extended; and a plurality of eyelets comprising a series of cable bushings configured to secure the cable on to the first pipe, wherein the plurality of eyelets is located near the third pulley end of the first pipe, wherein the plurality of eyelets is configured to horizontally align the first pulley and the second pulley, wherein the plurality of eyelets is configured to route the cable to the third pulley such that the stanchion can be lowered in to the slot.

19. The solid mast raiser system of claim 6, wherein the stanchion comprises a plurality of first studs comprising:

a ridge comprising a central body of the plurality of first spuds, wherein the ridge is a protrusion that conforms to the thickness of the first pipe and a plurality of second pipes, wherein a joint between the ridge and the first pipe or the plurality of second pipes is permanently fixed to form the stanchion;

a plurality of fittings located on both sides of the ridge, wherein the plurality of fittings are a fastener member that conforms and slips in to the inner diameter of the first pipe or the plurality of second pipes.

20. The solid mast raiser system of claim 6, wherein the plurality of second pipes comprises a plurality of second guides, wherein the plurality of second guides are located on both ends of the plurality of second pipes, wherein the plurality of second guides conforms and meshes with the plurality of first spuds such that corresponding plurality of second pipes can stack up on another.

* * * * *